Dec. 16, 1924.

D. FERRARI 1,519,810

ANTISKID PNEUMATIC TIRE PROTECTOR

Filed April 10, 1924

INVENTOR
Dario Ferrari
BY
ATTORNEY

Patented Dec. 16, 1924.

1,519,810

UNITED STATES PATENT OFFICE.

DARIO FERRARI, OF BOSTON, MASSACHUSETTS.

ANTISKID PNEUMATIC-TIRE PROTECTOR.

Application filed April 10, 1924. Serial No. 705,496.

*To all whom it may concern:*

Be it known that I, DARIO FERRARI, a subject of the King of Italy, residing at Boston, in the county of Suffolk and State of Massachusetts, have invented certain new and useful Improvements in Antiskid Pneumatic-Tire Protectors, of which the following is a specification.

This invention relates to an anti-skid protector for pneumatic tires which is adapted to be removably mounted on the outer tube, or shoe, of the tire, and which may be readily replaced when worn at a smaller cost than that of the shoe, the invention having for an object the provision of a novel and simple device of this sort which can be readily removed and replaced when desired.

For further comprehension of the invention, and of the objects and advantages thereof, reference will be had to the following description and accompanying drawing, and to the appended claims in which the various novel features of the invention are more particularly set forth.

Fig. 1 of the drawing is a face view showing my improved protector applied to an automobile wheel.

Figure 1:
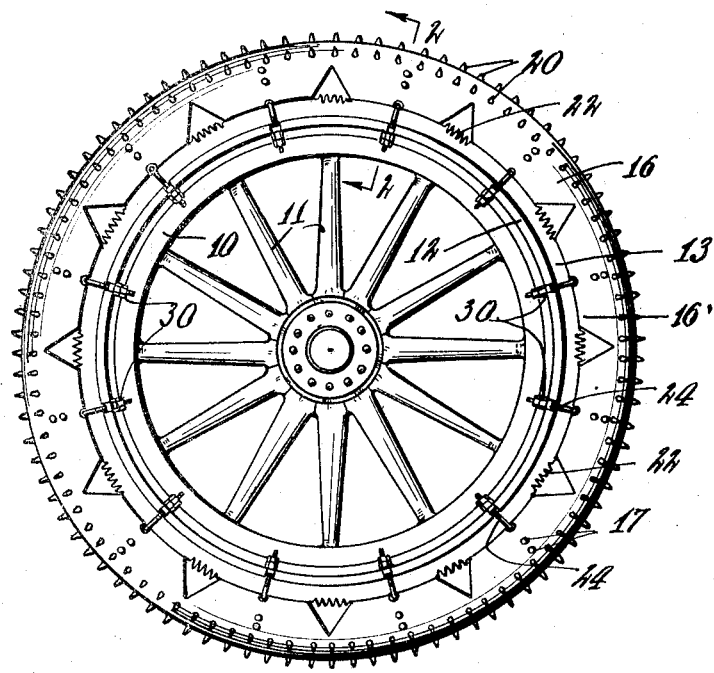
Figure 2:
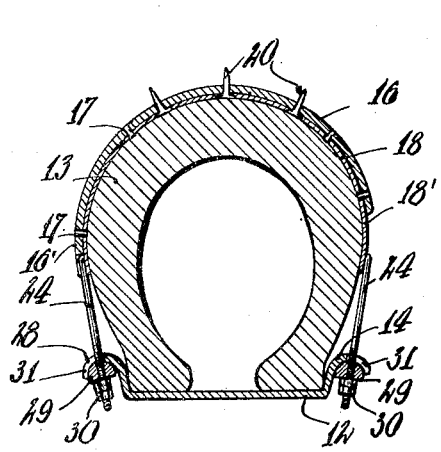
Fig. 2 is an enlarged detail transverse sectional view taken on the line 2—2 of Fig. 1.
Figure 3:
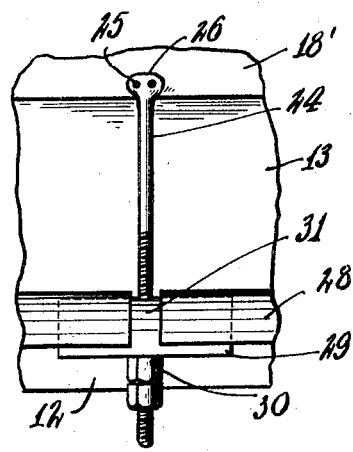
Fig. 3 is an enlarged fragmentary face view.

Referring now to the drawing, the reference numeral 10 indicates the felloe of an automobile and 11 the spokes thereof. The rim on which the tire is mounted is shown at 12 and the outer element or shoe of the tire at 13, the rim being provided with the upstanding flanges 14 at the sides which confine the tire in place. As here embodied my improved protector comprises an outer annular tread member 16 which encircles the tread portion of the tire. This outer member is preferably formed of hard leather or like-wear-resisting material. This outer member is fixed, as by the rivets 17 or otherwise, upon an inner annular member 18 which fits upon the tire element 13 and which is preferably made of soft leather. Suitably fixed in this inner member are the studs or spikes 20 which are suitably spaced around the tire and which project through the outer member 16.

The inner member 18 is formed with a series of flaps 18' on each side thereof which extend inwardly, these flaps having converging ends as shown, the ends of adjacent flaps being connected by the tension springs 22.

The flaps 16' are preferably on the outer side of the wheel to act as guard against engagement of the wheel by street curb.

Fixed in any suitable manner to the inner edges of the flaps are the ends of screws 24, there being here shown one screw to each flap which is fastened to the flap midway between the ends of the latter. As here shown the screw is fastened to the flap by means of rivets 25 passing through the flap and through the flattened end 26 of the screw.

These screws 24 are adapted to be secured to the rim element 12. As here shown the latter is formed with backturned flanges 28 providing channeled elements one on each side of the rim which are adapted to receive the elongated blocks 29 through which the screws 24 pass freely, the blocks being formed with suitable transverse apertures to receive the screws. A pair of nuts 30 is threaded on the inner end of each screw, while the backturned flanges 29 are formed with notches 31 which permit of passage of the screws when the blocks are being inserted into the channeled elements or removed therefrom.

When the tire is deflated, the protector may be readily slipped into place thereon or removed therefrom, the flaps 18' being thrown back. After the protector has been placed in position the flaps are swung inwardly and the blocks 29 engaged with the channeled elements in the rim, nuts 30 being tightened after inflation of the tire drawing the protector tightly against the tire. My improved protector both acts as an anti-skid device and to prevent wear of the shoe, and may be readily replaced when worn out.

Having thus described my invention what I claim as new and desire to protect by Letters Patent of the United States is as follows:—

1. In a wheel, a tire holding rim, a tire seated thereon, a protector encircling said tire and comprising a tread portion and inwardly extending flaps, a channeled element extending around the side of the said rim, blocks engaged in said channeled element, screws attached at one end to said flaps and passing freely through said blocks, and nuts threaded upon said screws and adapted to bear on said blocks to hold the protector in place.

2. In a wheel, a tire holding rim, a tire seated thereon, a protector encircling said tire and comprising a tread portion and inwardly extending flaps, a channeled element extending around the side of the said rim, blocks engaged in said channeled element, screws attached at one end to said flaps and passing freely through said blocks, and nuts threaded upon said screws and adapted to bear on said blocks to hold the protector in place, said channeled element being formed on one side with notches to receive said screws.

In testimony whereof I have affixed my signature.

DARIO FERRARI.